US010746930B2

(12) United States Patent
Kennedy et al.

(10) Patent No.: US 10,746,930 B2
(45) Date of Patent: Aug. 18, 2020

(54) MULTIPLE OPTICAL FIBER TAP DEVICE AND METHODS OF USE THEREOF

(71) Applicant: Micatu Inc., Horseheads, NY (US)

(72) Inventors: James Kennedy, Corning, NY (US); Scott Stelick, Slaterville Springs, NY (US); Kris Walker, Watkins Glen, NY (US); Atul Pradhan, Pittsford, NY (US)

(73) Assignee: MICATO INC., Horseheads, NY (US)

( * ) Notice: Subject to any disclaimer, the term of this patent is extended or adjusted under 35 U.S.C. 154(b) by 0 days.

(21) Appl. No.: 15/976,535

(22) Filed: May 10, 2018

(65) Prior Publication Data

US 2018/0329145 A1    Nov. 15, 2018

Related U.S. Application Data

(60) Provisional application No. 62/504,820, filed on May 11, 2017.

(51) Int. Cl.
*G02B 6/42* (2006.01)
*G02B 6/28* (2006.01)
*G02B 6/38* (2006.01)

(52) U.S. Cl.
CPC .......... *G02B 6/2852* (2013.01); *G02B 6/385* (2013.01); *G02B 6/3885* (2013.01); *G02B 6/4204* (2013.01); *G02B 6/4221* (2013.01); *G02B 6/4286* (2013.01)

(58) Field of Classification Search
CPC .............................. G02B 6/2852; G02B 6/4286
See application file for complete search history.

(56) References Cited

U.S. PATENT DOCUMENTS

| 4,212,512 | A |   | 7/1980  | Hodge |
| 4,357,104 | A | * | 11/1982 | Davinson ............... G01B 11/14  250/559.38 |
| 4,475,789 | A |   | 10/1984 | Kahn |
| 4,844,573 | A | * | 7/1989  | Gillham ............... G02B 6/4246  385/42 |
| 5,140,319 | A | * | 8/1992  | Riordan .............. E21B 47/0002  166/250.17 |
| 5,299,275 | A |   | 3/1994  | Jackson et al. |
| 6,030,411 | A | * | 2/2000  | Lawandy ............. A61N 5/0601  606/15 |

(Continued)

OTHER PUBLICATIONS

International Search Report and Written Opinion for corresponding PCT/US2018/032108, dated Jul. 26, 2018.

*Primary Examiner* — Ellen E Kim
(74) *Attorney, Agent, or Firm* — Troutman Pepper Hamilton Sanders LLP (Rochester)

(57) ABSTRACT

The present invention relates to an optical tap device. The optical tap device includes a cylinder having a rigid outer surface. A ferrule is configured to be located within the outer surface of the cylinder. The ferrule includes an inner chamber extending along a length of the ferrule. An emitter fiber and at least one tap fiber are located within the inner chamber. The emitter fiber is positioned within the inner chamber to be located at a central axis of a light source abutting the ferrule and the at least one tap fiber is positioned within the inner chamber to be located radial to the central axis of the light source abutting the ferrule. An optical feedback system and a method of providing optical feedback are also disclosed.

20 Claims, 5 Drawing Sheets

(56) References Cited

U.S. PATENT DOCUMENTS

| | | | |
|---|---|---|---|
| 6,241,397 B1 * | 6/2001 | Bao | G02B 6/241 372/20 |
| 6,433,924 B1 * | 8/2002 | Sommer | H01S 3/06754 359/333 |
| 6,551,302 B1 * | 4/2003 | Rosinko | A61M 25/0084 604/22 |
| 6,634,795 B2 * | 10/2003 | Pawluczyk | G02B 6/3636 385/54 |
| 6,955,657 B1 * | 10/2005 | Webler | A61M 25/0084 604/527 |
| 6,980,713 B2 * | 12/2005 | Hwang | G02B 6/29364 385/19 |
| 6,999,663 B2 | 2/2006 | Gage et al. | |
| 7,187,826 B2 * | 3/2007 | Brun | G02B 6/29364 385/140 |
| 7,235,047 B2 * | 6/2007 | MacAulay | G02B 21/0028 359/201.1 |
| 7,347,631 B2 * | 3/2008 | Suzuki | G02B 6/4204 385/15 |
| 9,366,831 B2 * | 6/2016 | Takeuchi | G02B 6/4214 |
| 9,429,721 B2 * | 8/2016 | Nielson | G02B 6/3885 |
| 9,547,130 B1 * | 1/2017 | Chen | G02B 6/266 |
| 2003/0156799 A1 | 8/2003 | Wade et al. | |
| 2006/0045444 A1 * | 3/2006 | Miller | G02B 6/04 385/115 |
| 2011/0176776 A1 * | 7/2011 | Imamura | G02B 6/02042 385/59 |
| 2012/0044966 A1 * | 2/2012 | Stoppel | F02P 23/04 372/70 |
| 2013/0308938 A1 * | 11/2013 | Sugimoto | H01S 3/1301 398/38 |
| 2014/0291682 A1 * | 10/2014 | Huang | H01L 31/1075 257/55 |
| 2016/0025929 A1 | 1/2016 | Mei et al. | |
| 2017/0033514 A1 * | 2/2017 | Wang | H01R 13/7175 |
| 2017/0299827 A1 * | 10/2017 | Pelletier | G02B 6/4251 |
| 2020/0073059 A1 * | 3/2020 | Takeuchi | G02B 6/3825 |

* cited by examiner

MULTIPLE OPTICAL FIBER TAP DEVICE AND METHODS OF USE THEREOF

This application claims the benefit of U.S. Provisional Patent Application Ser. No. 62/504,820 filed May 11, 2017, which is hereby incorporated by reference in its entirety.

FIELD OF THE INVENTION

The present invention pertains to the field of optical devices, and more specifically, to a multiple optical fiber tap device, system, and methods of use thereof.

BACKGROUND OF THE INVENTION

Light sources, such as light emitting diodes (LEDs) and incandescent lamps among others, suffer degradation over time. The degradation causes a decrease in the output or emitted power of the light source, which negatively impacts analog telemetry optical systems where control of the emitted power is critical in order to provide stable and accurate measurements. Optical taps can be used to split a portion of output light and send it to a detector, such that light output can be monitored and compensated.

Existing optical taps make use of several techniques, including free space optics, partial mirrors, fused fibers, and etched cladding pickoff. Producing such optical taps requires a relatively large physical device, pricey components, and expensive capital equipment, or a combination of these. An example of an early type of optical tap was made by twisting together two lengths of optical fiber, heating the twisted pair in a twist region, and pulling the twisted pair from either end to encourage fusion at the heated region. The resulting component has four ports. Typically, when monitoring transmitter power, one port is coupled to the optical source, a second port is spliced to the output fiber, a third port is redundant and so is placed in a reservoir of index-matched oil, and from the last port provides a monitored light signal from which the transmitted output power can be calculated. Such an optical tap incurs a penalty in the form of reduction of transmitted power. Some power is diverted to the monitor photodetector and some is lost by device coupling imperfections.

U.S. Pat. No. 4,475,789 teaches a fiberoptic tap used for monitoring purposes. The tap includes one fiber, having a certain mode volume, that is spliced to a second fiber having a relatively lower mode volume, such that a portion of light is radiated away from the splice, in passing from the first fiber to a second fiber. The radiated light is directed to a photodetector. The disclosed optical tap has applications in transmitter power monitoring since the radiated optical power is superfluous to the light that is capable of transmission by the line fiber. U.S. Patent Application Publication No. 2016/0025929 describes an optical tap comprising a beamsplitter, three ports, three optical fiber-supporting ferrules, and two collimating lens. The device is complex, requiring a first light beam to pass through a first port and fiber. The beam is then expanded through a collimating lens, before being split by a beam splitter. The split light is then sent to a second and third port and fiber, wherein light intensity can be monitored.

Limitations to existing optical taps include their complexity, size, and cost. In addition, to facilitate tap pickoff many of these methods impair the main light transmission path by beam splitting, resulting in a signal loss.

The present invention is directed to overcoming these and other deficiencies in the art.

SUMMARY OF THE INVENTION

The present invention relates to an optical tap device. The optical tap device includes a ferrule comprising an inner chamber extending along a length of the ferrule. An emitter fiber is located within the inner chamber of the ferrule. The emitter fiber is positioned within the inner chamber such that in use the emitter fiber is configured to be located at a central axis of a light source located proximate to the ferrule. At least one tap fiber is located within the inner chamber and radially offset from the emitter fiber such that in use the at least one tap fiber is configured to be positioned radial to the central axis of the light source located proximate to the ferrule.

Another aspect of the present invention relates to an optical tap feedback system. The optical tap feedback system includes a light source optically coupled the optical tap device of the present invention. The light source is located proximate to the ferrule such that such that the emitter fiber is located at a central axis of the light source and the at least one tap fiber is positioned radial to the central axis of the light source. An optically responsive device is optically coupled to the emitter fiber to receive a light beam emitted from the light source through the emitter fiber. A detector is optically coupled to the at least one tap fiber to receive a portion of a light beam emitted from the light source through the at least one tap fiber. A feedback computing device is coupled to the detector and the light source. The feedback computing device includes a processor and a memory coupled to the processor which is configured to execute one or more programmed instructions stored in the memory to receive an intensity value for the portion of the light beam emitted from the light source through the at least one tap fiber. A power adjustment is provided to the light source based on the received intensity value.

Yet another aspect of the present technology relates to a method of providing optical feedback. The method includes optically coupling a light source to the optical tap device of the present invention. The light source is located proximate to the ferrule such that such that the emitter fiber is located at a central axis of the light source and the at least one tap fiber is positioned radial to the central axis of the light source. The method further includes receiving, by a feedback computing device, an intensity value for the portion of the light beam emitted from the light source through the at least one tap fiber. The feedback computing device provides a power adjustment to the light source based on the received intensity value.

The present device monitors the output power of a light source, including but not limited to a light emitting diode (LED) or an incandescent lamp, by harvesting a fixed portion of the emitted light. The harvested light is split off and transmitted to a photodiode that can detect light intensity. The measurements from the photodiode are then used as input to a feedback control system.

Advantages of the device of the present technology include the potential for the device to have a small physical package, which allows optical power to be inexpensively monitored in a closed loop control system. The optical tap device of the present technology advantageously provides an inexpensive and robust solution that minimizes space requirements for the optical tap. An additional advantage of the present technology is that the main fiber is configured to be aligned with the center axis with the light source. As a result, there is no impairment or loss of coupling power to the main fiber. The tap fiber lies radial relative to the center axis and is located one fiber pitch away such that it collects a known portion of the emitted Gaussian optical power, in this example 2% nominal. This is done with no loss in coupled power to the main fiber. The tapped light is then converted to an electrical signal via a photodiode and a transimpedance amplifier and used as an input to a feedback control system.

DETAILED DESCRIPTION

The present invention pertains to the field of optical devices, and more specifically, to a multiple optical fiber tap device, system, and methods of use thereof.

The present invention relates to an optical tap feedback system. The optical tap feedback system includes a light source optically coupled the optical tap device of the present invention. The light source is located proximate to the ferrule such that such that the emitter fiber is located at a central axis of the light source and the at least one tap fiber is positioned radial to the central axis of the light source. An optically responsive device is optically coupled to the emitter fiber to receive a light beam emitted from the light source through the emitter fiber. A detector is optically coupled to the at least one tap fiber to receive a portion of a light beam emitted from the light source through the at least one tap fiber. A feedback computing device is coupled to the detector and the light source. The feedback computing device includes a processor and a memory coupled to the processor which is configured to execute one or more programmed instructions stored in the memory to receive an intensity value for the portion of the light beam emitted from the light source through the at least one tap fiber. A power adjustment is provided to the light source based on the received intensity value.

Figure 1:
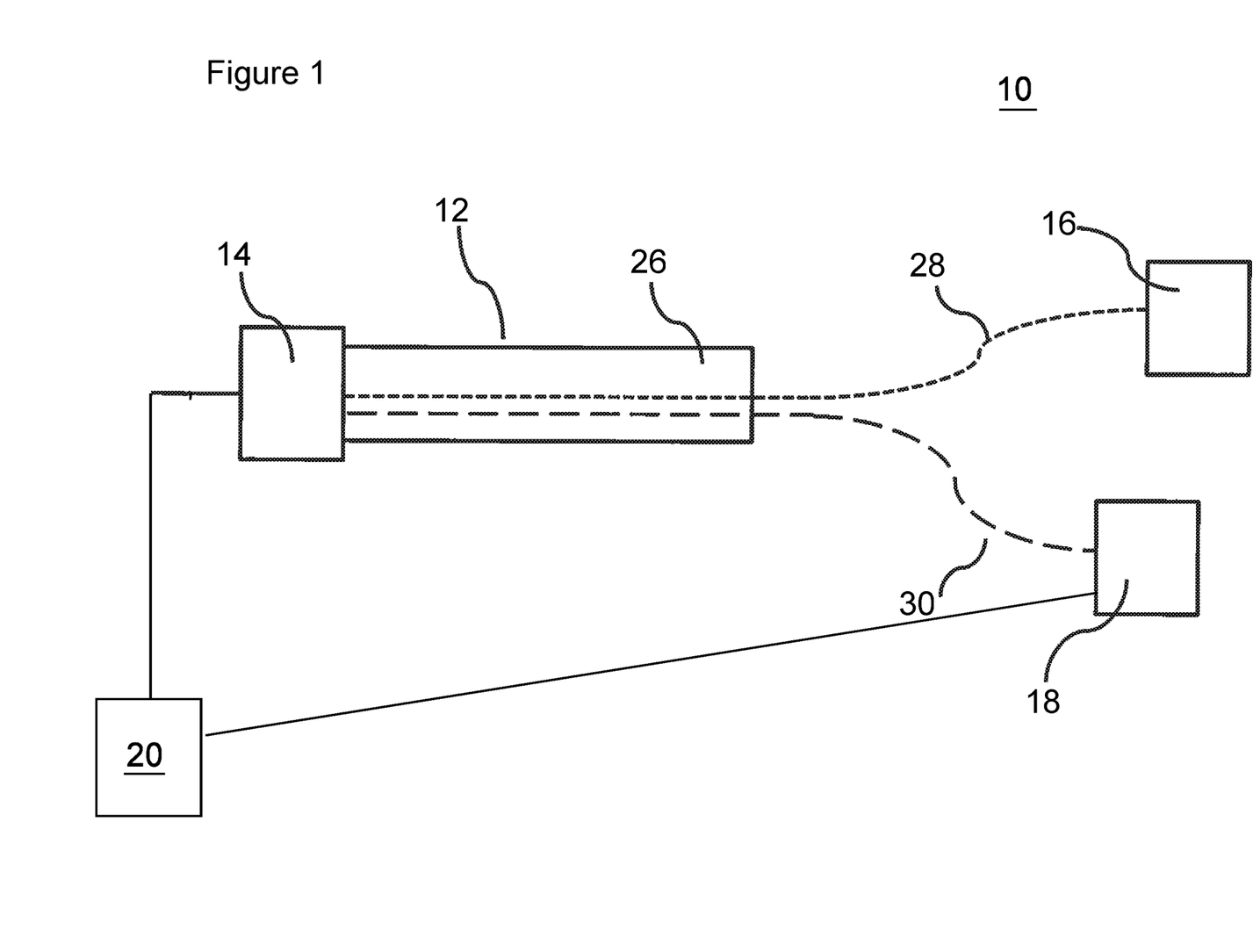
FIG. 1 is a longitudinal partial schematic view and partial block diagram of an exemplary optical tap feedback system including an exemplary optical tap device and external connections.
Figure 2:
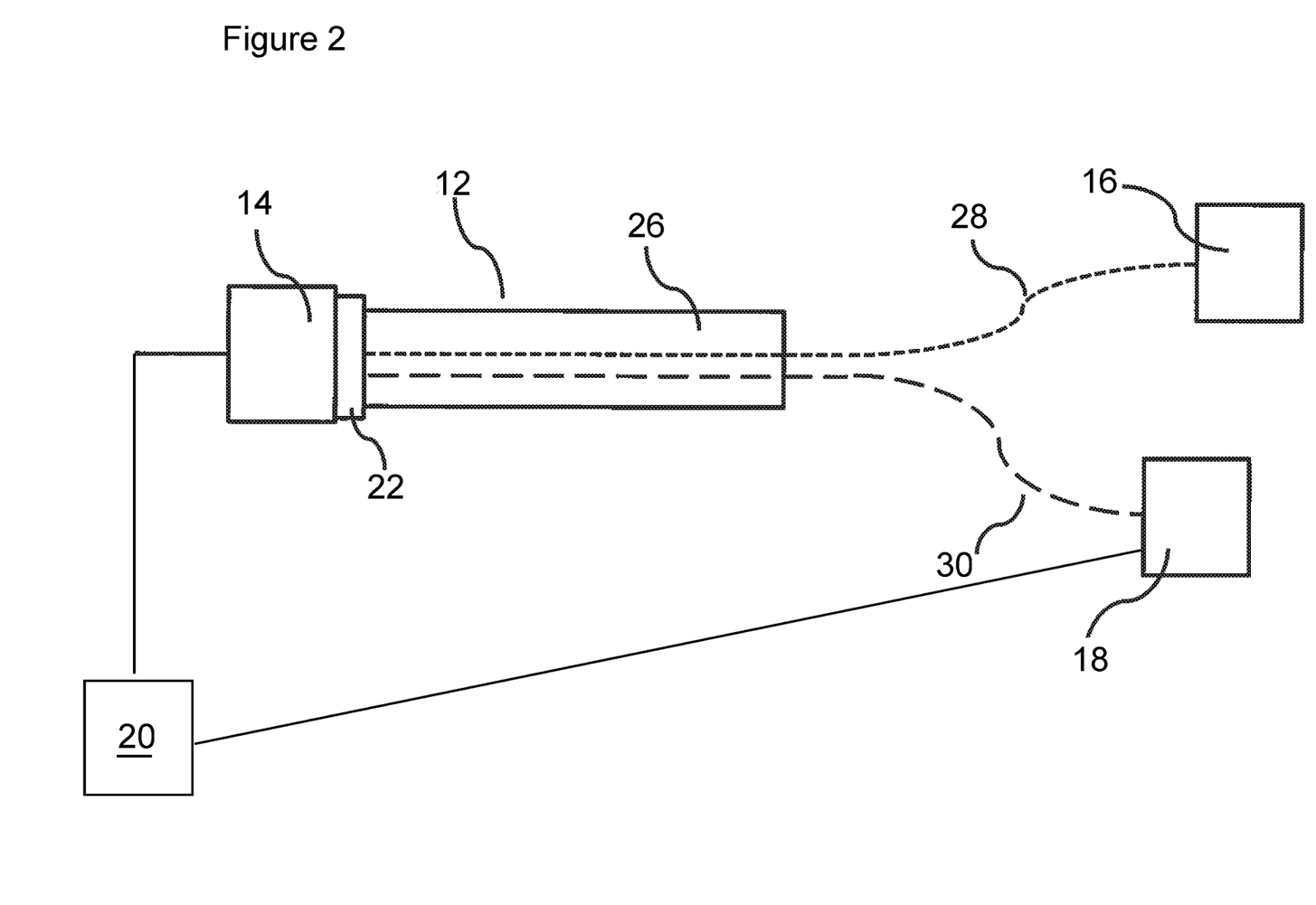
FIG. 2 is a longitudinal partial schematic view and partial block diagram of the exemplary optical tap feedback system of FIG. 1 with an additional lens positioned between the light source and the optical tap device.

An exemplary optical tap feedback system 10 is illustrated in FIG. 1. Optical tap feedback system 10 includes an optical tap device 12, a light source 14, a sensor device 16, a detector 18, and a feedback computing device 20, although the system may include other types and/or numbers of elements or components in other configurations, including a lens 22 as illustrated in FIG. 2. Additionally, optical feedback system 10 may include additional optical components such as lenses, collimators, or mirrors, and/or additional electronic components such as amplifiers, analog to digital converters, and digital to analog converters, by way of example only.

The present technology advantageously provides an optical tap feedback system for monitoring and adjusting output power of a light-emitting device, such as an LED or an incandescent lamp. The optical tap device employed in the system provides a small physical package, which allows optical power to be inexpensively monitored in the closed loop control system. The optical tap device of the present technology advantageously provides an inexpensive and robust solution that minimizes space requirements for the optical tap, and also imparts no impairment or loss of coupling power to the main fiber.

The present invention also relates to an optical tap device. The optical tap device includes a ferrule comprising an inner chamber extending along a length of the ferrule. An emitter fiber is located within the inner chamber of the ferrule. The emitter fiber is positioned within the inner chamber such that in use the emitter fiber is configured to be located at a central axis of a light source located proximate to the ferrule. At least one tap fiber is located within the inner chamber and radially offset from the emitter fiber such that in use the at least one tap fiber is configured to be positioned radial to the central axis of the light source located proximate to the ferrule.

Referring now more specifically to FIGS. 1-3B, optical tap device 12 includes a cylinder 24, a ferrule 26, an emitter fiber 28, and an optical tap fiber 30, although optical tap device 12 may include other types and/or numbers of elements or components in other configurations. Optical tap device 12 advantageously provides an apparatus that enables a fixed portion of light emitted from light source 14, to be split for measurement. The split portion of light can be used to measures light intensity to monitor for degradation of light source 12 that is used, for example, in a telemetry application.

Cylinder 24 provides a housing for optical tap device 12. In this example, cylinder 24 is a precision stainless-steel tube that forms a rigid outer surface of optical tap device 12, although other sufficiently rigid materials may be employed for cylinder 24. Cylinder 24 is configured to house and surround ferrule 26, although other elements may be located within cylinder 24. Cylinder 24 is configured to abut light source 14 and align ferrule 26 to light source 14. In one example, light source 14 is located within cylinder 24.

Figure 3A:
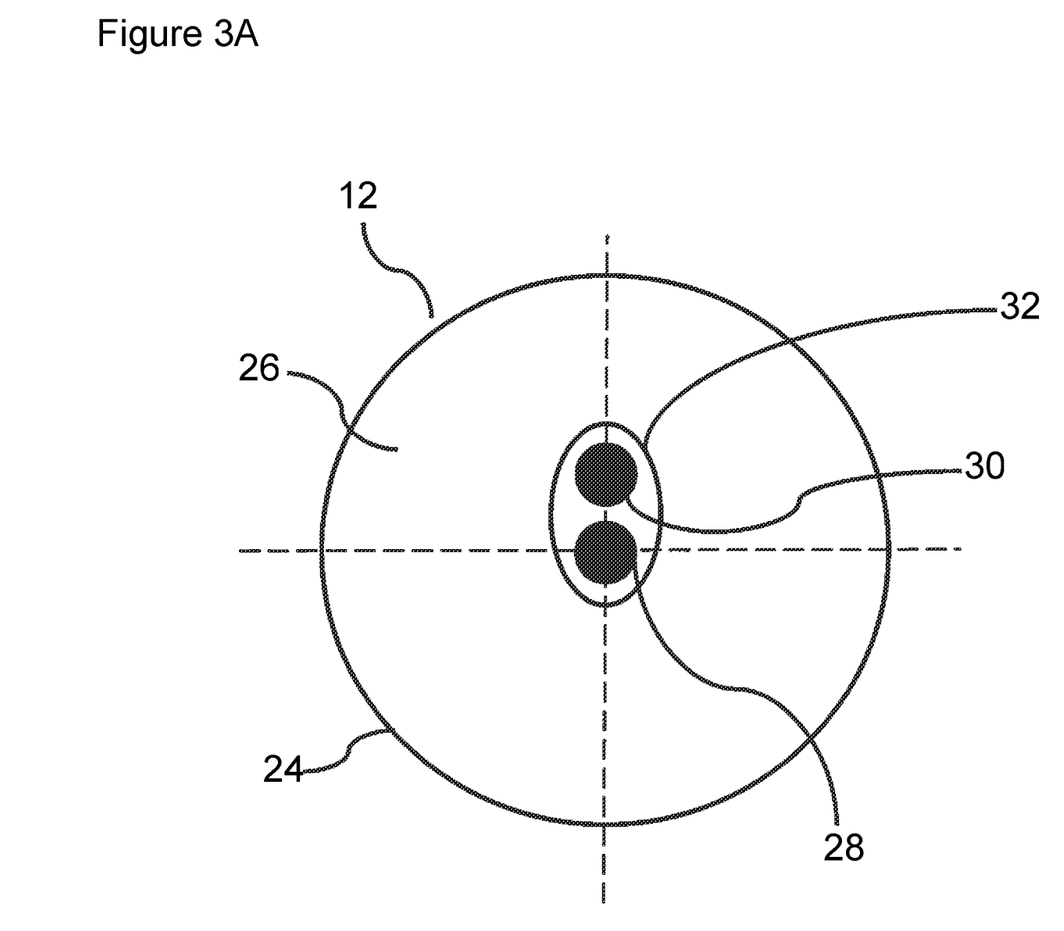
FIGS. 3A and 3B are cross-sectional views of exemplary optical tap devices of the present invention.
Figure 3B:
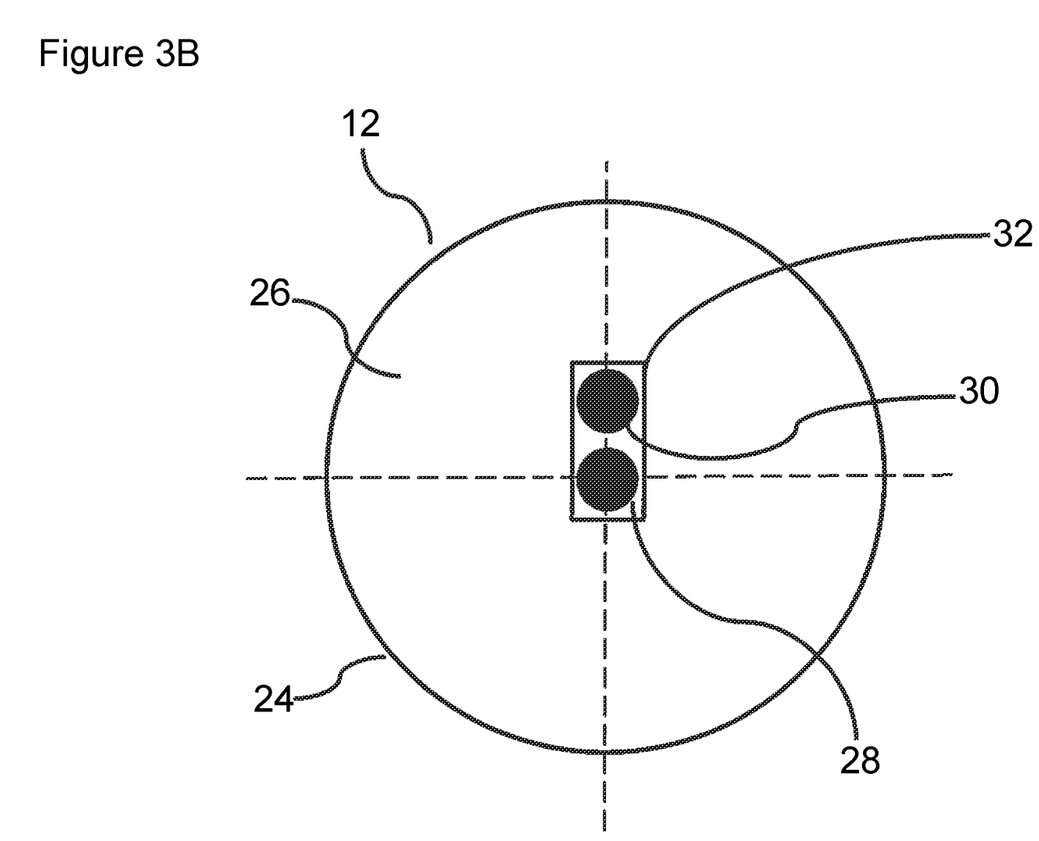

Ferrule 26 is located within cylinder 24. For purposes of this disclosure, a ferrule is defined as a rigid component used to align and protect the stripped end of an optical fiber. Ferrule 26 can be comprised of various materials such as borosilicate, ceramic, or similar rigid materials known in the art. Referring now to FIGS. 3A and 3B, within ferrule 26 is a hole 32 that runs the length of 26 ferrule. Hole 32 provides an inner chamber extending along the length of ferrule 26 that is configured to house optical tap fiber 30 and emitter fiber 32. In one example, hole 32 is in an oval configuration as shown in FIG. 1A. In another example, hole 32 is in a rectangular configuration as shown in FIG. 1B, although other shapes may be contemplated for hole 34, such that hole 32 holds optical tap fiber 30 and emitter fiber 28 in place.

Hole 32 is defined by the inner chamber of ferrule 26 and is configured to be aligned with light source 14 when optical tap device is positioned next to light source 14 as shown in FIG. 1. Hole 32 is positioned such that, in use, optical emitter fiber 28 is positioned precisely in line with a central axis of light source 14, and such that optical tap fiber 30 is aligned on the radial of the central axis of light source 14. Precise alignment of optical tap fiber 30 on the center axis of the light source 14 controls the percentage of light tapped from the light source. In one example, the center hole 32 is aligned with the central axis of ferrule 26, although other configurations may be employed.

Emitter fiber 28 is positioned within ferrule 26 such that emitter fiber 28, during use, when cylinder 24 is positioned with respect to light source 14, emitter fiber 28 is positioned on the center axis of light source 14. In one example, emitter fiber 28 is positioned at the central axis of ferrule 26 and aligned with the center of hole 32, although other configurations may be employed. Emitter fiber 28 is optically coupled to sensor device 16, such that light from light source 14 is delivered to sensor 16 through emitter fiber 28.

Optical tap fiber 30 is positioned with ferrule 26 radially offset from emitter fiber 28, such that optical tap fiber 30 is aligned radial to the center axis of light source 14. Optical tap fiber 30 lies radial relative to the center axis. In one example, optical tap fiber 30 is located one fiber pitch away from the central axis of light source 14 such that it collects a known portion of the emitted Gaussian optical power. For example, optical tap fiber 30 may collect 20% of the Gaussian optical power, or it may collect 10% or 5% of the Gaussian optical power. In another example, optical tap fiber 30 collects a maximum of 2% of the Gaussian optical power. Regardless of how much of the Gaussian optical power from light source 14 is collected by optical tap fiber 30, there is no loss in coupled power to emitter fiber 28. Optical tap fiber 30 is optically coupled to detector 18, such as a photodiode. In another example, a plurality of optical tap fibers can be positioned within the inner chamber of ferrule 26 and radially offset from the main emitter fiber such that in use the plurality of tap fibers are configured to be positioned radial to the central axis of light source 14 abutting ferrule 26.

Referring again to FIG. 1, light source 14 is configured to have a surface that abuts ferrule 26 to optically couple light source 14 to emitter fiber 28 and optical tap fiber 30. In one example, as shown in FIG. 2, light source 14 is coupled to emitter fiber 28 and optical tap fiber 30 through lens 22, such as a Grin lens, a plano convex lens, a bi-convex lens, or any other lens known in the art. Light source 14 can be a light emitting diode (LED), an incandescent lamp, or any other light source known in the art. Light source 14 has an electrical connection that permits power delivered to light source 14 to be modulated. In one example, light source 14 has an electrical connection that provides a voltage potential through which current flows therefore delivering electrical power that can be modulated to light source 14. The power delivered to light source 14 may be modulated using signals from feedback computing device 20, by way of example, as described further below.

Sensor device 16 is optically coupled to light source 14 through emitter fiber 28. Sensor device 16 can be an optical sensor or similar optical responsive device. In one example, sensor device 16 is an analog telemetry system that uses light from light source 14 to make an optical measurement. Sensor device 16 may be used to measure various parameters, such as voltage or current, using the optical signal from light source 14, although sensor device 16 can be utilized to measure any other parameters that may be measured optically. Sensor device 16 can also be coupled to one or more computing devices used to process the optical measurements.

Detector 18 in this example is a photodiode although other detector devices may be utilized, such as an avalanche photodiode (APD), a photomultiplier, a complementary metal-oxide-semiconductor (CMOS) detector, or a charge coupled device (CCD), by way of example only. Detector 18 is configured to monitor the intensity of light received through optical tap fiber 30. Detector 18 is coupled to feedback computing device 20 to provide the intensity levels of light received from light source 14 through optical tab fiber 30. In one example, detector 18 is coupled to feedback computing device 20 by an analog to digital converter, although other electronics such a transimpedance amplifier, by way of example only, may be utilized to provide the signals from detector 18 to feedback computing device 20.

Figure 4:
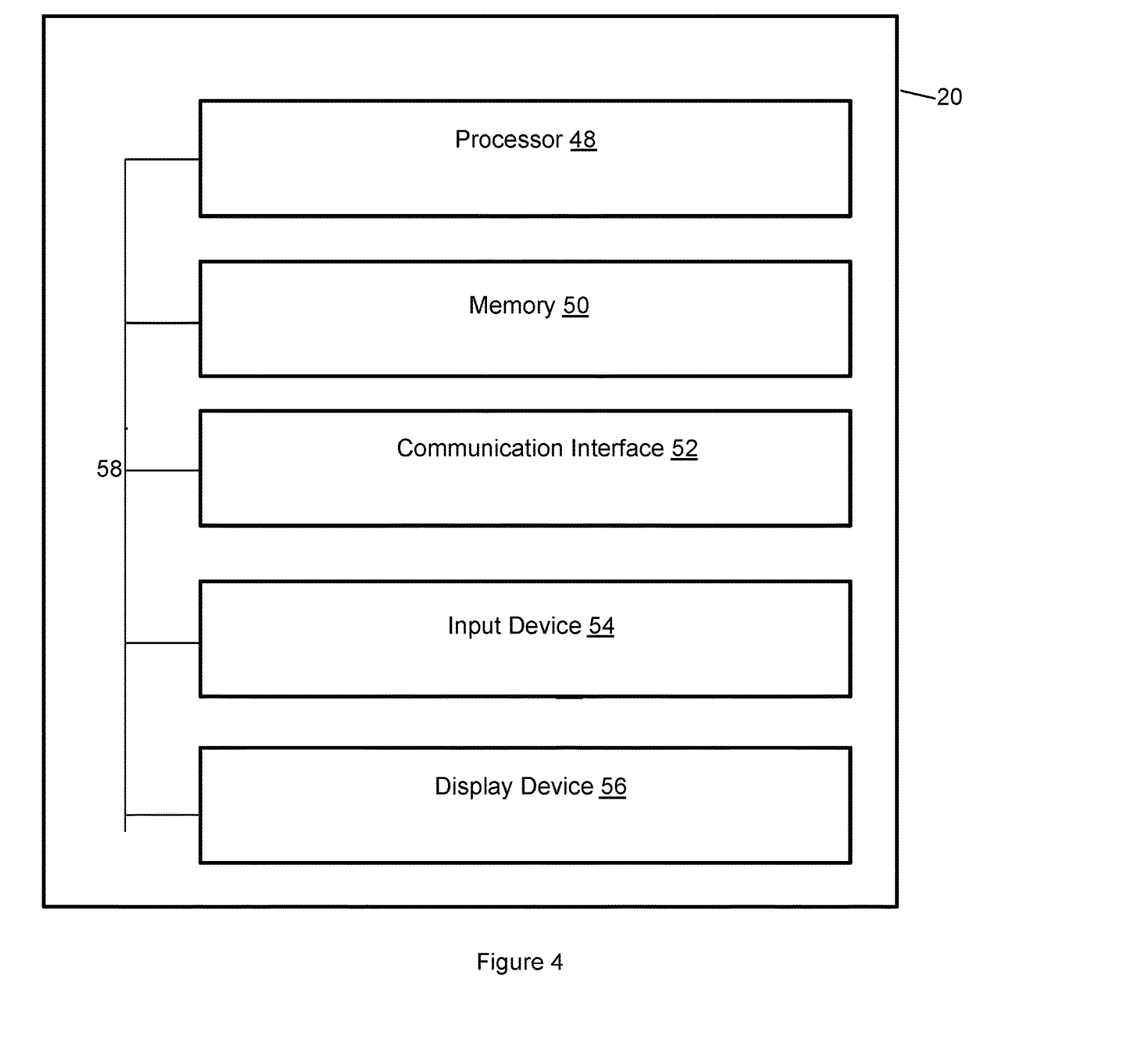
FIG. 4 is a block diagram of an exemplary analyzing computing device for use in the system illustrated in FIG. 1.

Feedback computing device 20 is coupled to detector 18. Feedback computing device 20 is also coupled to light source 14 to provide modulations of power of the light emitted from light source 14. By way of example, feedback computing device 20 may be coupled to light source 14 through a digital to analog converter to provide an electrical connection to light source 14 to provide modulations of the power emitted by light source 14, although other electronics may also be employed to couple feedback computing device 20 to light source 14. Feedback computing device 20 includes processor 48, memory 50, communication interface 52, input device 54, and display device 56, which are coupled together by bus 58 or other communication link, although other numbers and types of systems, devices, components, and elements in other configurations and locations can be used.

Processor 48 executes a program of instructions stored in memory 50 for one or more aspects of the present technology. Other numbers and types of systems, devices, components, and elements in other configurations and locations can be used to execute the program of instructions stored in memory 50.

Memory 50 stores these programmed instructions for one or more aspects of the present technology, although some or all of the programmed instructions could be stored and/or executed elsewhere. A variety of different types of memory storage devices, such as a random access memory (RAM), read only memory (ROM), hard disk, CD ROM, DVD ROM, or other computer readable medium which is read from and written to by a magnetic, optical, or other reading and writing system that is coupled to processor 38, can be used for memory 50.

Communication interface 52 is used to operatively couple and communicate between feedback computing device 20 and one or more other computing devices via a communications network. Other types and numbers of communication networks or systems with other types and numbers of connections and configurations can be used for communication between feedback computing device 20 and one or more other computing devices. By way of example only, the communications network could use TCP/IP over Ethernet and industry-standard protocols, including NFS, CIFS, SOAP, XML, LDAP, and SNMP. Other types and numbers of communication networks, such as a direct connection, a local area network, a wide area network, modems and phone lines, e-mail, and wireless communication technology, each having their own communications protocols, can be used by the communication networks.

The input device 54 and display device 56 of analyzing computing device 18 enable a user to interact with feedback computing device 20, such as to input and/or view data and/or to configure, program, and/or operate feedback computing device 20, by way of example only. Input device 54 may include a keyboard, computer mouse, and/or touch screen, and display device 56 may include a computer monitor. Other types and numbers of input devices and/or display devices could also be used in other examples.

Yet another aspect of the present technology relates to a method of providing optical feedback. The method includes optically coupling a light source to the optical tap device of the present invention. The light source is located proximate to the ferrule such that such that the emitter fiber is located at a central axis of the light source and the at least one tap fiber is positioned radial to the central axis of the light source. The method further includes receiving, by a feedback computing device, an intensity value for the portion of the light beam emitted from the light source through the at least one tap fiber. The feedback computing device provides a power adjustment to the light source based on the received intensity value.

An exemplary operation of optical tap feedback system 10 will now be described with reference to FIGS. 1-4. Light source 14 is optically coupled to optical tap device 12 by locating light source 14 proximate to ferrule 26 located in cylinder 24. Light source 14 is positioned with respect to ferrule 26 such that emitter fiber 28 is located at a central axis of light source 14 and optical tap fiber 30, which is radially offset from emitter fiber 28 within ferrule 26, is positioned radial to the central axis of light source 14. In one example, light source 14 is optically coupled to optical tap device 12 through lens 22, as shown in FIG. 3, which can be a Grin lens, a plano convex lens, or a bi-convex lens, by way of example only.

Light from light source 14 or lens is emitted and picked up by emitter fiber 28 and optical tap fiber 30. In one example, light from light source 14 travels through lens 22 prior to be picked up by emitter fiber 28 and optical tap fiber 30, although other optics may be employed.

Light from emitter fiber 28, which is aligned with the central axis of light source 14, is transmitted to sensor device 16, which may include devices such as optical sensors for measuring voltage or current, by way of example only. The positioning of emitter fiber 28 at the central axis of light source 14 allows light to be delivered from light source 14 to sensor device 16 through emitter fiber 28 with no loss in coupled power. Optical tap fiber 30 carries a portion of light from light source 14 to detector 18, such as a photodiode or similar device, which is configured to monitor the intensity of light received through optical tab fiber 30.

Next, feedback computing device 20 receives an intensity value for the portion of the light beam emitted from light source 14 through the optical tap fiber 30 from detector 18. By monitoring intensity of the tapped light, power to light source 14 can be adjusted via an electrical connection, for example, by adjusting a voltage potential. Fluctuations in tapped light from light source 14 can be compensated for by modulating the power provided to light source 14. Feedback computing device 20 provides a power adjustment to light source 14 based on the received intensity value from detector 18.

Advantages of the present device include the potential of said device to comprise a small physical package, which allows optical power to be inexpensively monitored in a closed loop control system. An additional advantage of the present invention is that the main emitter fiber is aligned with the center axis with the light source, thus there is no impairment or loss of coupling power to this fiber. The technology may applied to an analog telemetry system to compensates for system errors including optical connector losses, fiber impairments, sensor aging, sensor temperature variability due to materials and semiconductor aging or temperature effects.

EXAMPLE

An optical tap was constructed by placing two 200 uM silica fibers into a 500 uM groove of a 3D printed clamshell-like ferrule, such that 0.5 mm of fiber protruded from the end of the ferrule. The clamshell ferrule was folded and the fibers were glued in place using adhesive. The fibers and an LED were placed into a 15-mm stainless steel tube with an inner diameter of 4.63 mm. The LED and the fibers were aligned within the tube by adjusting the depth of the fibers and by rotating the LED within the stainless-steel tube. After adjusting, the power was peaked on the main emitter fiber so that output power was 550 uW, and the power on the tap fiber was measured to be 16 uW, or 2.9% of the main emitter fiber power.

Experimental Procedure

An optical tap was constructed by placing two 200 uM silica fibers into a 500 uM groove of a 3D printed clamshell-like ferrule, such that 0.5 mm of fiber protruded from the end of the ferrule. The clamshell ferrule was folded and the fibers were glued in place using adhesive. The fibers and an LED were placed into a 15-mm stainless steel tube with an inner diameter of 4.63 mm. The LED and the fibers were aligned within the tube by adjusting the depth of the fibers and by rotating the LED within the stainless-steel tube. After adjusting, the power was peaked on the main emitter fiber so that output power was 550 uW, and the power on the tap fiber was measured to be 16 uW, or 2.9% of the main emitter fiber power.

It should be understood that the description and specific examples presented here, while indicating preferred embodiments of the invention, are given by way of illustration only, since various changes and modifications within the spirit and scope of the invention will become apparent to those skilled in the art from this detailed description.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. An optical tap device comprising:
   a rigid cylinder having an outer surface configured to abut a light source;
   a ferrule positioned within and entirely surrounded by the rigid cylinder such that the ferrule is located proximate to the light source when the rigid cylinder abuts the light source, the ferrule comprising an inner chamber extending along a length of the ferrule;
   an emitter fiber located within the inner chamber of the ferrule, wherein the emitter fiber is positioned within the inner chamber such that in use the emitter fiber is configured to be located at a central axis of the light source when the light source is located proximate to the ferrule to collect light from the light source, wherein the emitter fiber is not directly coupled to the light source, wherein the emitter fiber is configured to be coupled to an optically responsive device; and
   at least one tap fiber located within the inner chamber and radially offset from the emitter fiber such that in use the at least one tap fiber is configured to be positioned radial to the central axis of the light source when the light source is located proximate to the ferrule to collect light from the light source, wherein the at least one tap fiber is configured to be coupled to a detector.

2. The optical tap device of claim 1 further comprising:
a plurality of tap fibers positioned within the inner chamber and radially offset from the emitter fiber such that in use the plurality of tap fibers are configured to be positioned radial to the central axis of the light source abutting the ferrule.

3. The optical tap device of claim 1, wherein the at least one tap fiber is radially offset at least one fiber pitch from the emitter fiber.

4. The optical tap device of claim 1 further comprising:
the light source having a surface abutting the ferrule and optically coupled to the emitter fiber and the at least one tap fiber.

5. The optical tap device of claim 4, wherein the light source is one of a laser, a light emitting diode (LED), or an incandescent light source.

6. The optical tap device of claim 1, wherein the cylinder is formed of stainless-steel.

7. The optical tap device of claim 1, wherein the ferrule is formed of borosilicate or ceramic.

8. The optical tap device of claim 1, wherein the inner chamber is rectangular or oval in shape.

9. The optical tap device of claim 1 further comprising:
an optically responsive device optically coupled to the emitter fiber to receive a light beam emitted from the light source through the emitter fiber; and
a detector optically coupled to the at least one tap fiber to receive a portion of the light beam emitted from the light source through the at least one tap fiber.

10. The optical tap device of claim 1, wherein the optically responsive device comprises an optical sensor.

11. The optical tap device of claim 9, wherein the detector is one of a photodiode, an avalanche photodiode (APD), a photomultiplier, a complementary metal-oxide-semiconductor (CMOS) detector, or a charge coupled device (CCD) detector.

12. The optical tap device of claim 9 further comprising:
a feedback computing device coupled to the detector and the light source, the feedback computing device comprising a processor and a memory coupled to the processor which is configured to execute one or more programmed instructions stored in the memory to:
receive an intensity value for the portion of the light beam emitted from the light source through the at least one tap fiber; and
provide a power adjustment to the light source based on the received intensity value.

13. An optical tap feedback system comprising:
a light source optically coupled to an optical tap device comprising a rigid cylinder having an outer surface configured to abut the light source, a ferrule positioned within and entirely surrounded by the rigid cylinder such that the ferrule is located proximate to the light source when the rigid cylinder abuts the light source, the ferrule comprising an inner chamber extending along a length of the ferrule, an emitter fiber located within the inner chamber of the ferrule, wherein the emitter fiber is positioned within the inner chamber such that in use the emitter fiber is located at a central axis of the light source, when the light source is located proximate to the ferrule, to collect light from the light source, wherein the emitter fiber is not directly coupled to the light source, and at least one tap fiber located within the inner chamber and radially offset from the emitter fiber such that in use the at least one tap fiber is positioned radial to the central axis of the light source, when the light source is located proximate to the ferrule, to collect light from the light source;
an optically responsive device optically coupled to the emitter fiber to receive a light beam emitted from the light source through the emitter fiber;
a detector optically coupled to the at least one tap fiber to receive a portion of the light beam emitted from the light source through the at least one tap fiber; and
a feedback computing device coupled to the detector and the light source, the feedback computing device comprising a processor and a memory coupled to the processor which is configured to execute one or more programmed instructions stored in the memory to:
receive an intensity value for the portion of the light beam emitted from the light source through the at least one tap fiber; and
provide a power adjustment to the light source based on the received intensity value.

14. The optical tap feedback system of claim 13 further comprising:
a plurality of tap fibers positioned within the inner chamber and located radial to the central axis of the light source.

15. The optical tap feedback system of claim 13, wherein the at least one tap fiber is radially offset at least one fiber pitch from the emitter fiber.

16. The optical tap feedback system of claim 13, wherein the at least one tap fiber is positioned to collect at least 0.5%, at least 1%, at least 2%, at least 5%, at least 10%, at least 20%, or at least 50% of the Gaussian optical power of the light beam emitted from the light source.

17. The optical tap feedback system of claim 13, wherein the light source is one of a laser, a light emitting diode (LED), or an incandescent light source.

18. The optical tap feedback system of claim 13, wherein the optically responsive device comprises an optical sensor.

19. The optical tap feedback system of claim 13, wherein the detector is one of a photodiode, an avalanche photodiode (APD), a photomultiplier, a complementary metal-oxide-semiconductor (CMOS) detector, or a charge coupled device (CCD) detector.

20. A method of providing optical feedback, the method comprising:
optically coupling a light source to the optical tap device of claim 1, wherein the light source is located proximate to the ferrule such that such that the emitter fiber is located at a central axis of the light source and the at least one tap fiber is positioned radial to the central axis of the light source;
receiving, by a feedback computing device, an intensity value for the portion of the light beam emitted from the light source through the at least one tap fiber; and
providing, by the feedback computing device, a power adjustment to the light source based on the received intensity value.

* * * * *